United States Patent [19]

Karas et al.

[11] 4,179,258

[45] Dec. 18, 1979

[54] METHOD OF MOLDING PRODUCTS FROM MOIST MATERIALS AND APPARATUS REALIZING SAME

[76] Inventors: Genrikh E. Karas, ulitsa 8 Marta, 3, kv. 12, Semiluki Voronezhskoi oblasti; Ljudmila P. Lebedeva, Vitebsky prospekt, 53, korpus, 2, kv. 54, Leningrad; Anatoly A. Mukhin, ulitsa 8 Marta, 7, kv. 12; Anatoly D. Pivovarov, ulitsa 9 Yanvarya, 5, kv. 7, both of Semiluki Voronezhskoi oblasti; Vladimir I. Skrynnikov, ulitsa Leni Golikova, 84, kv. 17, Leningrad; Vladimir M. Yam, ulitsa Vernosti, 13, kv. 152, Leningrad; Vladimir T. Oleinik, 8 Sovetskaya ulitsa, 38, kv. 3, Leningrad; Vladimir V. Miroshnichenko, Drovyanoi pereulok, 4, kv. 9, Leningrad, all of U.S.S.R.; Vasily A. Kovtun, deceased, late of Semiluki Voronezhskoi oblasti, U.S.S.R.; by Lidia P. Kovtun, administrator, ulitsa 8 Marta, 7. kv. 19, Semiluki Voronezhskoi oblasti, U.S.S.R.; by Inna V. Soshnikova, administrator, ulitsa 8 Marta, 7, kv. 19, Semiluki Voronezhskoi oblasti, U.S.S.R.; by Sergei V. Kovtun, administrator, ulitsa 8 Marta, 7, kv. 19, Semiluki Voronesbakoi oblasti, U.S.S.R.

[21] Appl. No.: 945,911

[22] Filed: Sep. 26, 1978

Related U.S. Application Data

[60] Division of Ser. No. 760,436, Jan. 13, 1977, Pat. No. 4,140,744, which is a continuation of Ser. No. 529,531, Dec. 4, 1974, abandoned.

[51] Int. Cl.$^2$ ............................................... B28B 1/08
[52] U.S. Cl. ................................... 425/352; 425/421; 425/432
[58] Field of Search ................... 264/72; 425/352, 421, 425/432

[56] References Cited

U.S. PATENT DOCUMENTS

| 2,075,992 | 4/1937 | Lux ................................... 425/432 X |
| 3,277,551 | 10/1966 | Sekiguchi ......................... 425/421 X |
| 3,756,762 | 9/1973 | Maugweiler ...................... 425/421 X |
| 3,764,242 | 10/1973 | Fischer .............................. 425/432 X |
| 3,932,099 | 1/1976 | Burdy ................................. 425/432 |

*Primary Examiner*—Thomas P. Pavelko
*Attorney, Agent, or Firm*—Holman & Stern

[57] ABSTRACT

Products are molded in a mold assembled prior to molding from a lower punch and a mold case arranged in coaxial relationship, the mold being subjected, in the course of charging it with the material, to harmonic vibrations whereby the material undergoes precompaction, and the subsequent compaction of the material by the combined effect of a vertical vibratory shock load and a compressive load is aided by vibrating the mold case, the vertical vibratory shock load being applied to the material via the lower punch. The apparatus for molding products according to the method of the invention incorporates power cylinders mounted on a base, with an additional crosshead being suspended by elastic members on the rods of said power cylinders, said additional crosshead being adapted to reciprocate along the columns of the apparatus, and the additional crosshead mounts vibration exciters and a mold case, whereas the vibrating frame carries the lower punch mounted in coaxial relationship with the mold case.

1 Claim, 2 Drawing Figures

METHOD OF MOLDING PRODUCTS FROM MOIST MATERIALS AND APPARATUS REALIZING SAME

This is a divisional of application Ser. No. 760,436, filed Jan. 13, 1977, now U.S. Pat. No. 4,140,744, which in turn is a continuation of application Ser. No. 529,531 filed Dec. 4, 1974 now abandoned.

FIELD OF THE INVENTION

The present invention relates to a method of molding moist materials as well as to an apparatus for producing the method.

BACKGROUND OF THE INVENTION

The instant invention can be used in metallurgy, in the manufacture of refractories, ceramics and in other industries for molding products from metallic and cermet powders, molding and core sands, refractory and ceramic mixtures, etc.

The moist mixtures employed in molding are known to comprise a particulate component with binders, wetting agents and other additives, for which reason such mixtures are known as moist or bulk mixtures.

It is known in the art to mold products, e.g. slabs and items of predominantly simple shape and small height, from moist bulk mixtures by vibratory compaction thereof in a mold. The known method comprises charging a mold, made up of a case rigidly secured to a bottom and an upper punch, with a moist mixture and exerting a downward compressive lead on the mixture via the upper punch. After the mold is charged with the mixture it is subjected to an upwardly-directed vibratory shock load, while the downward compression pressure is simultaneously raised to a maximum (cf. USSR Inventor's Certificate No. 264,956, Cl. 80a, 49).

In order to raise the product density, the process of vibratory compaction is effected at a compressive load-to vertical vibratory shock load ratio of 0.4 to 0.7.

In the prior art technique, the mold is filled with the moist mixture non-uniformly due to the low mobility of the mixture as well as the lack of any means for uniformly distributing the mixture about the mold. This disadvantage is particularly significant if the products to be molded have a large height, small cross-section and an intricate configuration.

With the mold non-uniformly filled with the mixture, the molded product naturally exhibits a non-uniform pattern of density distribution with a resultant deterioration of quality. In order that the mold may be more effectively filled with the mixture during charging, the mixture is raked and levelled in the course of charging, which increases about consumption and reduces the efficiency of the molding process.

The products molded according to the known method with the mold case and bottom being rigidly interconnected and subjected to vibratory shock loading show a considerable degree of non-uniformity of density distribution. Hence, if their density is to be more uniformly distributed, it is necessary to increase the force of vibrations and the compression pressure as well as to prolong the time during which the material being compacted is exposed thereto. These factors increase in significance with the height of the product. As a result, the quality of the products deteriorates and the efficiency of the process drops. Additionally, the power consumption rises, entailing higher costs.

It is likewise known in the art to employ a vibratory-shock device for molding products from moist bulk materials, e.g. casting, molds, which comprises a vibrating frame with a vibration exciter, said frame mounting power cylinders which drive a mobile crosshead carrying an upper punch. The power cylinders simultaneously serve as guide columns for the mobile crosshead with the upper punch. The mold with the lower punch is secured directly on the vibrating frame. As the mold and the lower punch are rigidly anchored to the vibrating frame, this installation cannot be employed for molding products over 150 mm in height, because density non-uniformity in such items will exceed the allowable limit. Additionally operation of this known installation unavoidably involves hard manual labor in assembling and disassembling the mold and removing the molded products, which adds to the labor costs and detracts from the efficiency of molding.

SUMMARY OF THE INVENTION

It is an object of the present invention to eliminate the foregoing disadvantages.

The invention provides a method of molding products from moist materials that ensures high quality of the molded products, and an apparatus for molding products from moist materials that is conducive to a higher operating efficiency, lower power consumption and lower production cost for the products.

Accordingly, a method of molding products from moist materials, primarily refractory and and ceramic material is provided by charging the mold with the material and compacting simultaneously exposing the material to a vertical vibratory shock load applied from below and a compressive load applied to the material from above via the upper punch, whereby, in accordance with the invention, a mold assembled prior to molding from a lower punch and a case is used, the two elements being coaxially arranged, and the mold is subjected, in the course of charging, to harmonic vibrations which precompact the material. The subsequent compaction of the material by the combined effect of the upward vertical vibratory shock load and the downward compressive load is effected by additionally vibrating the mold case, the vertical shock vibrations being transmitted to the material via the lower punch.

The molding operation should preferably be carried out at a ratio of the downward compressive load to the upward vibratory shock load of 0.1 to 0.35, and at a difference of vibration amplitude between the mold case and the lower punch of 0.2 to 0.5 mm.

In an apparatus according to the invention, a vibrating frame is installed through an elastic padding on a base and carries columns which are connected in the upper portion thereof by a stationary crosshead with a power cylinder, whereof the rod carries a mobile crosshead with an upper punch, mounted on the base are power cylinders, with an additional crosshead suspended by means of elastic members on the rods of said power cylinders, said additional crosshead which is adapted to reciprocate along the columns carries a vibration exciter and a mold case, while a lower punch is secured on the vibrating frame coaxially with the mold case.

The inventive idea of the present invention resides in the following:

While molding moist materials in a mold comprising a case, a lower punch and an upper punch disconnected one from another, it is possible to expose the material being compacted to a variety of different loads varying in magnitude depending on the particular step of the process, with the result that high-quality products are manufactured at high operating efficiency with a minimum of power input and at a minimum of cost.

The mold is charged with the material and the latter in precompacted by imparting to the mold harmonic vibrations in the course of charging. Under the effect of these mold vibrations, the moist material acquires mobility, thereby permitting the charging process to be accelerated and the mold to be filled uniformly, even in case of very high and intricately shaped products, dispensing with manual labour; such an approach likewise enables the material in the mold to be precompacted. Additionally, the precompaction leads to a considerable reduction in height of the material with which the mold is charged, which permits cutting down the molding time, thereby adding to the operating efficiency of the entire procedure.

The subsequent compaction of the material in the mold is effected by means of shock vibrations applied to the material being molded from below and creating a pressure $P_1$ thereon, as well as by means of a compression pressure $P_2$ applied from above, and finally with the aid of vibrations applied through the lateral sides of the mold. The vibratory shock load is transmitted to the material by the lower punch; the compressive load by the upper punch; and the lateral load by the mold case. The mold case vibrations sharply reduce the effective coefficient of friction of the material against the case walls, so that the material is compacted by the combined effect of vibratory shock loading and compressive loading at a considerably reduced friction of the material against the lateral surfaces of the mold. Owing to this feature, it is possible to provide for a high and uniform density of the products at low values of compressive and vibratory shock loads and within a minimized process time.

The combined effort exerted on the material being compacted, made up of the lateral vibrations, the vibratory shock load from below and the compressive load from above, not only raises the intensity of the force exerted on the material but also reduces the effective coefficient of friction inside the material and raises its mobility. Owing to this feature, it is possible to uniformly compact the material even when molding products of intricate shape, large height and small cross-section, requiring minimal compressive and vibratory loading and a minimum of time.

The above features are particularly pronounced in cases where the ratio of the compressive load $P_2$ exerted on the material from above to the vertical vibratory shock load $P_1$ applied to the material from below ($P_2/P_1$) lies within the range from 0.1 to 0.35. At $P_2/P_1$ ratios smaller than 0.1, the upper punch vibrations will be unstable and their frequency will be less than that of the vibrations applied from below, so that the intensity of the vibratory lead on the material and, hence, the efficiency of the process will be reduced. At $P_2/P_1$ ratios in excess of 0.35, the upper punch will stay in permanent contact with the material so that the material will be exposed to vibratory shock loading only from below, causing a one-sided pattern of compaction, with the result that density differential will increase with the height of the product.

Lateral vibrations are most effective in minimizing the coefficient of friction between the material and the mold case where the amplitude $A_1$ of mold vibrations exceeds the amplitude $A_2$ of lower punch vibrations by a value in the range from 0.2 to 0.5 mm. At a vibration amplitude difference ($A_1-A_2$) less than 0.2 mm., the coefficient of friction will be reduced negligibly and the effect of the lateral vibrations on the material will be increased by a very small margin, resulting in reduced equidensity, heightwise, and overall density of the molded product; this also prolongs the compaction time which, in turn, detracts from the efficiency of the molding process. At an amplitude difference ($A_1-A_2$) more than 0.5, the interplay of the upward shock vibrations and the lateral vibrations will upset the stability of vibrations of the mold case and the lower punch, drastically minimizing their effect on the material being molded, with the result that the density of the product diminishes and the compaction process time increases.

The invention will be further understood from the following specific example illustrative of the proposed method.

EXAMPLE 1

It is required to manufacture saggers for recovering iron powder from casting skin, which are formed as pipes of external diameter 510 mm, internal diameter 450 mm and height 310 mm. The starting material is a moist silicon-carbide mixture comprising loan and sulphite-alcohol stillage as a binder taken in respective amounts of 3 and 7 percent by weight of the silicon carbide base. The mold comprises disconnected punches, an upper and a lower one, and a mold case made up of an inner and outer portions interconnected in four places by means of blocks spaced 90° about the circumference of the case. The lower punch provided with blind longitudinal slots is so fitted in the clearance between the inner and outer portions of the case that the blocks are received in the slots thereof.

The mold is charged with the moist material and is simultaneously subjected to harmonic vibrations generated by electromechanical exciters, the frequency of case vibrations being 50 Hz and the vibration amplitude difference between the case and the lower punch being 0.4 mm. In the course of charging, the material is thus precompacted by 15 percent. The material is further compacted by the combined effects of mold vibrations, a pressure $P_2$ equal to 1.8 kg/sq.cm. exerted compressively from above, and a pressure of 15 kg/sq.cm. exerted on the material from below, the $P_2/P_1$ ratio being 0.12. The compaction process lasts 25 seconds.

The products thus manufactured have a mean apparent density of 2.60 g/cu.cm. and a density differential through the product volume within 0.06 to 0.08 g/cu.cm.

EXAMPLE 2

It is required to manufacture guides for cementation furnaces, each guide formed as a parallelpiped measuring 575 by 180 mm in plan view and 90 mm in height having two bevelled edges measuring 80 by 30 mm along the long side on one lateral surface thereof. The starting material is a moist silicon-carbide mixture of the following composition, wt.%:

silicon carbide, 80;
crystalline silicon, 20; and
alcohol solution of bakelite of density 1.16 g/cu.cm. (binder), 7.5.

The binder is an extra component not included in the dry power weight. The mold comprises three independent elements: a lower punch, an upper punch and a case. The operations of charging and precompaction are performed along the lines set down in the previous example.

The step of final compaction is effected by the combined effect of mold vibrations, a compressive load $P_2$ equal to 2.5 kg/sq.cm. exerted from above and a vibratory pressure $P_1$ equal to 7.8 kg/sq.cm. exerted on the material from below, the $P_2/P_1$ ratio being 0.32. The compaction time is 10 to 15 seconds. The products have a mean apparent density of 2.70 g/cu.cm. and a density differential through the product volume of not greater than 0.05 g/cu.cm.

EXAMPLE 3

It is required to manufacture supports for the roasting of ceramics, formed as I-beams 200 mm in length and 200 mm in height, having a flange width of 100 mm and a web thickness of 25 mm. The starting material is a moist silicon carbide mixture of a composition identical with that given in Example 1. Just as in the previous two examples, the mold comprises a lower punch, an upper punch and a case disconnected one from another. In cross-section, the punches and the mold case are formed as I-beams.

The charging and precompaction steps are carried out as in Example 1. The final compaction step is likewise effected as in Examples 1 and 2 except that the compression pressure $P_2$ is equal to 2.1 kg/sq.cm. and the pressure $P_1$ exerted from below is equal to 8.4 kg/sq.cm., i.e. the $P_2/P_1$ ratio is equal to 0.25. The compaction time is 20 seconds. The products have a mean apparent density of 2.62 to 2.64 g/cu.cm. and a density differential through the product volume of not greater than 0.06 g/cu.cm.

The invention will be better understood from the accompanying drawings illustrating a preferred embodiment thereof, wherein:

DESCRIPTION OF THE PREFERRED EMBODIMENT

Figure 1:
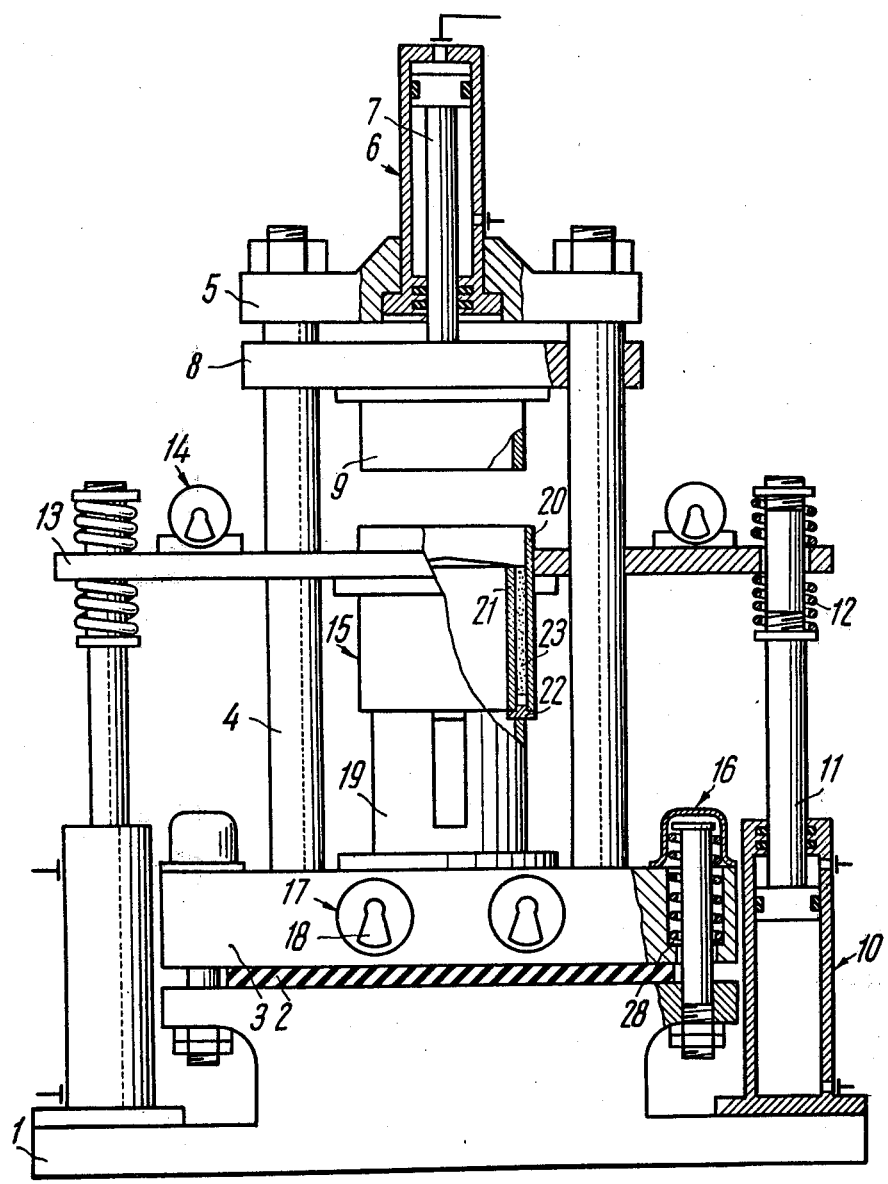
FIG. 1 is a front elevation of an apparatus for molding saggers for recovering iron powder from casting skin, saggers partially in section.
Figure 2:
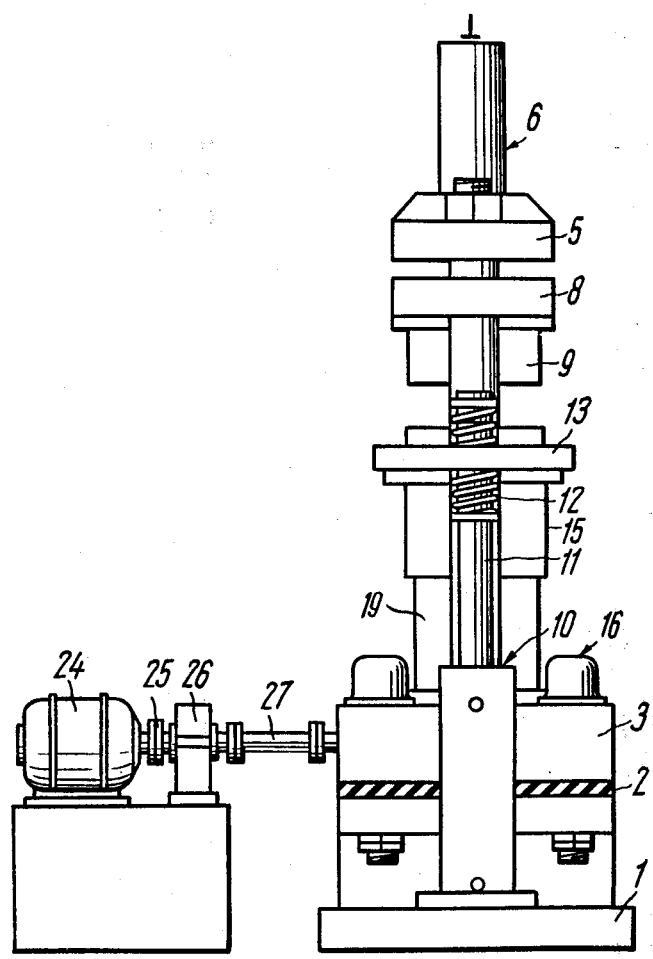
FIG. 2 is a side of the apparatus of FIG. 1

Referring now to the drawings, the apparatus comprises a base 1 (FIGS. 1 and 2) mounting a rubber padding 2. Mounted on the padding 2 is a vibrating frame 3 with columns 4 secured therein. A stationary crosshead 5 is fitted in the upper portion of the columns 4, the crosshead 5 carrying a power cylinder 6 secured therein, the rod 7 of the power cylinder 6 carrying a mobile crosshead 8 with an upper punch 9. On the base 1 there are mounted power cylinders 10, rods of which 11 mount, through springs 12, an additional crosshead 13 on which secured electromechanical vibration exciters 14 and a mold case 15. The vibrating frame 3 is pressed against the rubber padding 2 by clamp means 16. The vibrating frame mounts two electromechanical unbalance vibration exciters 17 with unbalancing members 18. A lower punch 19 is secured in the vibrating frame 3. The mold case 15 comprises two coaxially arranged cylindrical members 20 and 21 interconnected in the bottom portion thereof by blocks 22 at four points uniformly spaced about the circumference of the mold case 15. The mold case is so disposed that the lower punch 19 is received in the clearance between the cylindrical members 20 and 21, thereby defining a bind-bottom cavity to receive the molding mixture on charging. The vibrating frame 3, the columns 4 and the stationary crosshead 5 are interconnected one with another to form a rigid structure which provides for the precision of displacement of the mobile crosshead 8 with the upper punch 9 as well as of the additional crosshead 13 with the mold case 15 as they reciprocate relative to the lower punch 19. In the initial position, the mobile crosshead 8 (FIGS. 1 and 2) with the upper punch 9 as well as the additional crosshead 13 with the mold case 15 are found in their extreme upper positions, the members 20 and 21 of the mold case together with the upper cavity of the lower punch 19 defining a cavity for receiving mixture 23 upon charging.

Operation of the above-described apparatus illustrates the proposed method of molding products, e.g. saggers as follows:

The mold is charged, mechanically or manually, with a required amount of moist silicon-carbide mixture. The vibration exciters 14 (FIG. 1) are actuated; the unbalance shafts thereof rotate in opposite directions, imparting vertically-directed vibrations to the additional crosshead 13 suspended by the springs 12 and carrying the mold case 15. Acted upon by these vibrations, the moist material uniforms fills the cavity of the mold and simultaneously undergoes preliminary compaction.

The hydraulic cylinder 6 is actuated to lower the mobile crosshead 8 with the upper punch 9. While moving downward, the upper punch 9 compacts the material 23 in the mold; simultaneously, the mold case 15 with the additional crosshead 13 moves downward, fitting over the lower punch 19. As the additional crosshead 13 moves downwards, the rods 11 force the working fluid from the hydraulic cylinders 10. Electric motors 24 (FIG. 2), which drive the vibration exciter 17, are switched on, said motors 24 transmitting rotation via clutches 25 to a synchronizer 26 which retates, through cardan shafts 27, the unbalance shafts 18 of the vibration exciter 17 in opposite directions, said synchronizer 26 also synchronizing the rotations of said shafts in terms of speed and phase. Thereby the vibrating frame 3 together with the lower punch 19 secured thereon is driven into directional vertical vibration. Acted upon by the exciter 17, the vibrating frame 3 is detached from the elastic padding 2 and then is forced downward by the weight of the vibrating parts of the apparatus (the vibrating frame 3, the lower punch 19, the columns 4, the upper crosshead 5, the power cylinder 6 and the vibration exciter 17) as well as by the action of springs 28 of the clamp means 16 to strike against the elastic padding 2 which adds to the amplitude and acceleration of vibrations. Time is provided a vibratory shock mode, far more effective than harmonic vibrations as far as compaction efficiency is concerned. So, the material in the mold experiences the shock vibrations applied from below by the punch 19, the downward compressive load created by the upper punch 9, as well as the lateral vibrations generated at the inner and outer side surfaces and applied to the material through the mold case members 20 and 21. Under the effect of all these vibrations, the material in the mold is rapidly and uniformly compacted to a desired density.

20 to 25 seconds later (the time is set depending on the product size and the composition of the mixture) the electric motors are switched off, and the unbalance shafts of the vibration exciters 14 and 17 cease rotating, signifying the end of the compaction process.

The hydraulic cylinder 6 raises the mobile crosshead 8 with the upper punch 9 to its extreme upper position, while the hydraulic cylinders 10 lower the additional crosshead 13 with the mold case 15 downward, releasing the molded product from the mold. At the instant the hydraulic cylinders 10 are actuated, the electric motors driving the vibration exciters 14 are also switched on. With the mold case 15 vibrating while the molded product is being released from the mold, the required effort is considerably reduced and the operation is speeded up, thereby reducing the wear of the mold members 20 and 21. As soon as the upper edge of the product emerges from the mold case, the vibration exciters 14 are deenergized.

The product (sagger) left on the lower punch 19 is removed from the apparatus and delivered to the next step of the process (drying), whereupon the additional crosshead 13 with the mold case 15 is raised to its extreme upper position.

The cycle of sagger molding is over, and the apparatus is ready for the next cycle.

The capacity of the apparatus amounts to 40 to 45 products per hour. As is evident from the description, the proposed method for molding products from moist materials and the apparatus realizing same provide for the manufacture of quality products at a high operating efficiency.

What is claimed is:

1. An apparatus for molding products from moist bulk materials comprising:
   a base;
   an elastic padding mounted on said base;
   a vibrating frame resting on said elastic padding;
   a fastening means for fastening said vibrating frame to said base;
   columns secured on said vibrating frame;
   a stationary crosshead interconnecting said columns in the upper portion thereof;
   a power cylinder comprising a rod and a piston mounted on said stationary crosshead, said rod extending beyond said stationary crosshead in a downwardly direction;
   a mobile crosshead attached to said rod of said power cylinder guided by said columns;
   an upper punch secured to said mobile crosshead;
   a lower punch secured on said vibrating frame;
   further power cylinders comprising further rods and further pistons being mounted on said base;
   an additional crosshead mounted on said further rods and adapted to reciprocate and be guided along said columns;
   vibrations exciters mounted on said vibrating frame and said additional crosshead;
   a power means for powering said vibration exciters; and
   a mold case mounted on said additional crosshead, said mold case, said upper punch, and said lower punch being arranged collinearly.

* * * * *